Patented Dec. 13, 1938

2,139,686

UNITED STATES PATENT OFFICE 2,139,686

WHITE PIGMENT

Ekbert Lederle, Ludwigshafen, Max Günther, Mannheim, and Rudolf Brill, Heidelberg, Germany No Drawing. Application May 15, 1937, Serial No. 142,918. In Germany March 14, 1934

19 Claims. (Cl. 134—58)

This invention relates to substantially non-chalking white pigments characterized as comprising titanates.

In our copending application, Serial No. 11,164, filed March 14, 1935, of which this application is a continuation-in-part, we have described the preparation of substantially non-chalking white pigments characterized as comprising zinc titanate and/or zinc titanate in which a part of the zinc is replaced by magnesium. The present invention relates specifically to substantially non-chalking white pigments characterized as comprising zinc titanate in which a part of the zinc has been isomorphically replaced by magnesium.

In our aforementioned copending application, we have described the preparation of zinc titanate compositions corresponding to the ortho-titanate, $Zn_2TiO_4$, and to the metatitanate, $ZnTiO_3$. We have shown that the zinc titanate corresponding to the ortho variety possesses the crystalline structure, as determined by X-ray examination, of spinel, while the zinc titanate corresponding to the meta variety may possess, depending upon the conditions of manufacture, either the crystalline structure of spinel or corundum. We have further shown that by control of proportions of reactants and temperature of reaction the meta and ortho zinc titanate compositions may form mixed crystals of the spinel type. Furthermore, we have shown that a part of the zinc in such compositions can be isomorphically replaced by magnesium with a consequent further improvement in the pigment properties of the resulting products.

An object of the present invention is, therefore, a method of preparing substantially white pigments characterized as comprising zinc titanate in which a part of the zinc has been isomorphously replaced by magnesium. Another object of the present invention is a method of preparing zinc-magnesium titanate compositions possessing improved pigment properties, aside from resistance to chalking, over similar zinc titanate compositions which do not contain magnesium. Still another object of the invention is the novel zinc-magnesium titanate compositions resulting from the methods herein described. These and other objects will be readily appreciated from the following detailed description of our invention.

The method of the present invention, briefly described, comprises heating reactive titanium compounds with reactive zinc compounds and reactive magnesium compounds in the proportions of 1 mol. of $TiO_2$ to at least 0.9 mol. equivalent of the mixture of ZnO and MgO at temperatures between about 500° and about 1100° C. until the product is substantially free from uncombined $TiO_2$. Depending on variations in proportions and temperature the resulting products may comprise: (a) zinc-magnesium titanate corresponding to the ortho variety and possessing the crystalline structure of spinel; (b) zinc-magnesium titanate corresponding to the meta variety and possessing the crystalline structure of spinel or of corundum; (c) zinc-magnesium titanate corresponding to the ortho and meta variety crystallizing as mixed crystals of the spinel type; (d) mixtures of zinc-magnesium titanate possessing the crystalline structure of spinel and zinc-magnesium titanate possessing the crystalline structure of corundum being meta or ortho-titanates according to the quantity of zinc bound in the titanate.

The respective conditions of proportions and temperature by which the above enumerated zinc-magnesium titanate compositions may be prepared will now be described.

In connection with our investigations on the preparation of zinc titanate compositions which constitute the basis of our copending application, Serial No. 11,164, we discovered that when 1 mol. of titanium dioxide is heated at temperature between 500 C. and 1100° C., with at least 0.9 mol. zinc oxide, there is formed, when all the titanium dioxide has been combined, a zinc titanate corresponding to the formula of the meta-titanate, $ZnTiO_3$, which by further heating may be transformed into ortho-titanate. We found that at the relatively low temperatures within this range, say between 500° C.–900° C., the zinc titanate tends to assume the crystalline structure of spinel. When the reaction is carried out at elevated temperatures within this range, say between 900°–1100° C. the product tends to assume the crystalline structure of corundum, probably by conversion of initially formed spinel into corundum.

We have also found that when the same relative molecular proportions are maintained, i. e., 1 mol. $TiO_2$ to at least 0.9 mol. of a mixture of ZnO and MgO, the lower temperatures within the range 500° C.–1100° C., say temperatures between 500–900° C., favor the formation of a zinc magnesium titanate composition having the crystalline structure of spinel while the higher temperatures favor the formation of a product having the crystalline structure of corundum. In fact, the presence of magnesium tends to facilitate the conversion of spinel into corundum and, consequently, a saving of time or a lowering of temperature may be effected.

When the molecular proportions of the mixture of zinc oxide and magnesium oxide in relation to the titanium dioxide are increased, say between 1 mol. and 1.5 mols, the lower temperatures within the specified range between 500–900° C., tend to produce zinc-magnesium titanate compositions corresponding to the ortho- and meta-varieties as mixed crystals having the crystalline structure of spinel. At higher temperatures within this range say between 900–1100° C. mixtures of zinc magnesium titanate having the crystalline structure of spinel and zinc-magnesium titanate having the crystalline structure of corundum are obtained. When the proportions of the mixture of zinc oxide and magnesium oxide are raised to about 2 mols. to 1 mol. of $TiO_2$ the resulting zinc-magnesium titanates possess the crystalline structure of spinel. This holds true for the whole temperature range between 500 and 1100° C. With sufficiently long heat treatment finally the ortho-titanates are formed. They are formed exclusively if upon 1 mol. each of $TiO_2$ 2 mols of ZnO plus MgO are present. In every other case at most mixed crystals between meta- and ortho-titanates are formed.

As regards the proportion of quantity between magnesium and zinc in the titanates, the magnesium is preferably present in a quantity of between 5 and 50 atom percent of the sum of both. In quantities below 5% nothing is to be observed of the improving action of the magnesium, for instance with regard to the coloring strength and covering power, while pigments in which more than 50 atom percent of the sum of zinc and magnesium fall upon magnesium are chemically only slightly resistant.

In the aforementioned copending application, we have disclosed a method for the control of the particle size of the zinc titanate compositions. Similarly this method is applicable to the preparation of zinc-magnesium titanates.

Thus, we have found that the size of the primary particles of zinc-magnesium titanates is of particular importance with respect to their behavior in surface coating compositions. While the size of the secondary particles, i. e., the aggregates made up of several particles, appears to determine the pigment properties such as tinting strength, hiding power, etc., of the zinc-magnesium titanates, the size of the primary particles appears to determine their catalytic, or chemical behavior, such as polymerizing action on oleaginous vehicles, their susceptibility to destruction by atmospheric influences, and the like. The determination of the size of the primary particles may be made by means of an X-ray examination. We have found that sharp interference lines begin to appear upon the X-ray photographs when the primary particles size of the zinc-magnesium titanates reach $10^{-6}$ cm. With increasing particle size of the zinc-magnesium titanates, as with the zinc titanates, we have found that the X-ray interference lines tend to increase in sharpness and coincident therewith the zinc-magnesium titanates become more resistant to atmospheric conditions.

In order to control particle size of the zinc-magnesium titanates, we have found that a two-step calcination is advantageous. For example, the zinc-magnesium titanate may be initially formed, or partially formed, at a relatively low temperature within the range of 500° C.–1100° C., say at from 500°–800° C. and then further heated at relatively higher temperatures, say between 800° C. and up to 1100° C.

In the manufacture of our novel zinc-magnesium titanate pigment it is possible to employ the oxides, for example, zinc oxide or magnesium oxide and titanium dioxide, $TiO_2$ or hydrous titanium oxide. In place of the zinc oxide or magnesium oxide other compounds of zinc or magnesium, which, on heating, yield these oxides, may be employed. For example, among such compounds the carbonates, hydrocarbonates and compounds containing sulfur and oxygen may be mentioned. The zinc and magnesium compounds may contain a portion of the metal itself or metallic zinc and magnesium may be employed. In such cases, it is necessary to carry out the calcination in the presence of an oxidizing agent, for example, air. Thus, any zinc or magnesium compounds or even the metals themselves which on heating to a temperature within the range stated above, yield a corresponding oxide, may be used in the practice of our invention. In this description and in the claims appended hereto, we have employed the terms "reactive zinc compound" and "reactive magnesium compound" to designate such compounds. It is possible to employ titanium compounds other than titanium dioxide, $TiO_2$, for example, uncalcined hydrous titanium oxide or titanium sulfate. Thus any titanium compound which on heating to a temperature within the range stated above, yields titanium dioxide may be used in the practice of our invention. In the description and in the claims appended hereto we have employed the term "reactive titanium compound" to designate such compounds. In any event, regardless of the nature of the compounds employed the proportions are calculated on the basis of zinc oxide and magnesium oxide in relation to the titanium dioxide $TiO_2$ content of the titanium compounds.

The starting material, that is the reactive zinc compound and reactive magnesium compound and the titanium compound should be intimately mixed together prior to heating. Such intimate mixture may be effected by milling the starting ingredients together in the presence of water. The time required for the reaction may be readily established by testing the reaction mixture from time to time during the heating. Test samples are examined for the presence of uncombined zinc oxide. This determination is made in the well-known manner by extracting with ammoniacal ammonium salt solution. From the difference between the total amount of zinc oxide and magnesium oxide employed and the amount of free zinc oxide and magnesium oxide so determined, the quantity of combined zinc oxide and magnesium oxide as well as the quantity of combined titanium dioxide can be calculated.

Mineralizers, for example, alkali metal sulfates or chlorides, borates, tungstates and vanadates and the like, may be employed to cut down the time of reaction. By the term "mineralizer" as used in this description and in the claims appended hereto, we mean the substances, for example, those just enumerated which, acting as a flux, produce a slight sintering action during the heating of the reactive zinc and magnesium compounds with the titanium compound. When using mineralizers in the practice of our invention, it will be understood that the quantity employed should not be so great as to bring about a fusion of the reaction mixture.

The starting mixture of zinc and magnesium compounds on the one hand, or the mixture of zinc, magnesium and titanium compounds may advantageously be produced by precipitation. For example, titanium dioxide may be suspended in a solution containing a zinc salt and a magnesium salt in desired proportions and a precipitating agent, such as a water-soluble, alkaline oxide, hydroxide, carbonate, etc. added thereto. The precipitated mixture of zinc and magnesium oxides, hydroxides, carbonates or hydrocarbonates and titanium dioxide, may be then washed and, if desired, dried and then calcined. Furthermore, the reaction components can be prepared by simultaneous precipitation from solutions containing soluble titanium salts, for example, titanium sulfate, as well as zinc and magnesium compounds. In this case, the addition of the above mentioned alkalis will precipitate not only zinc and magnesium but the titanium as well. Furthermore, zinc oxide and magnesium oxide may be suspended in a hydrolyzable titanium oxide solution and a hydrous titanium oxide hydrolytically precipitated together with the zinc and magnesium oxide by heating.

The novel zinc-magnesium titanates of the present invention may also be prepared by calcining a reactive magnesium compound with a zinc titanate composition prepared according to the methods described in our aforementioned copending application, Serial No. 11,164. In such case the zinc titanate composition should be prepared from proportions of less than 2 mol. zinc oxide in order that the magnesium oxide may be taken up in an amount, if desired, up to 2 mol. equivalents of zinc oxide and magnesium oxide to 1 mol. of titanium dioxide $TiO_2$.

In determining the relative amount of reactive zinc compound and reactive magnesium compound to be employed in the practice of our invention the molecular equivalent should be borne in mind. That is to say, the molecular weight of zinc oxide is approximately 81.38 and the molecular weight of magnesium oxide is 40.32. Consequently, one part of MgO is equivalent to approximately 2 parts of ZnO in the preparation of our novel zinc-magnesium titanates.

After preparation, our novel zinc-magnesium titanates, pigments may be blended with extenders, for example, barium sulfate, calcium sulfate, etc., in the well known manner. In order to remove the last traces of uncombined zinc oxide and/or magnesium oxide the products of calcination may be lixiviated, or washed, with an ammoniacal ammonium salt solution which acts as a solvent for the zinc oxide and the magnesium oxide. If desired, the washed or lixiviated product may be recalcined in order to bring about mixed crystal formation or to convert a zinc-magnesium titanate composition of the meta variety having the crystalline structure of spinel into one having the crystalline structure of corundum.

The invention is further illustrated by the following examples without being restricted thereto:

*Example No. 1*

One kilogram of finely divided calcined titanium dioxide, $TiO_2$, is intimately and uniformly mixed with 750 grams of a mixture of 500 grams of ZnO and 250 grams of MgO. (The molecular equivalents are thus 1 mol. of the mixture of ZnO and MgO to 1 mol. $TiO_2$). The mixture is then calcined at about 800° C. until substantially all the titanium dioxide is combined, as determined by analysis of a test sample, 2½ to 3 hours being usually required.

The calcined product, after cooling, is wet milled and dried. The resulting pigment consists of zinc-magnesium titanate corresponding to the meta variety in which there is combined one atom of zinc for every atom of magnesium. It possesses a crystalline structure which is that of spinel. It has a pure white color, and a very fine uniform particle size distribution.

*Example No. 2*

A portion of the product obtained from the practice of Example 1 is recalcined at 1100° C. for from one to two hours until it is converted into a product having corundum crystalline structure.

After milling the recalcined product, the resulting pigment is similar to the product obtained from Example No. 1 but has a slightly larger particle size.

*Example No. 3*

A quantity of hydrous titanium oxide containing 1200 grams of $TiO_2$ is intimately mixed by wet milling with 1350 grams of ZnO and 225 grams of MgO. (The molecular equivalents are thus 1.5 mols. of ZnO plus MgO to 1 mol. $TiO_2$). The mixture is then fed to a rotary calciner and maintained in a temperature zone of about 850° C. for about three hours.

The product after cooling and pulverizing is a zinc-magnesium titanate composition corresponding to the ortho- and meta-varieties existing as mixed crystals of the spinel type, and containing 1 atom of magnesium for every 3 atoms of zinc.

*Example No. 4*

The same starting mixture as used in Example No. 3 was calcined at 1100° C. for about 2½ hours.

The product consisted of a mixture of zinc-magnesium titanate corresponding to the meta-variety possessing the crystalline structure of corundum and zinc-magnesium titanate possessing the crystalline structure of spinel.

*Example No. 5*

Twelve hundred grams of titanium dioxide are intimately mixed with 1600 grams of zinc oxide and 400 grams of magnesium oxide. (The molecular equivalents are thus 2 mols. of ZnO plus MgO to 1 mol. $TiO_2$.) The resulting mixture is calcined at about 975° C. for about 3 hours.

After cooling and pulverizing the resulting product is a zinc-magnesium titanate corresponding to the ortho-variety, possessing the crystalline structure of spinel, and containing 1 atom of magnesium for every two atoms of zinc.

*Example No. 6*

Thirteen hundred and fifty grams of zinc oxide and 225 grams of magnesium oxide are suspended in 63 liters of a hydrolyzable solution of titanium sulfate containing 20 grams of $TiO_2$ per liter. The titanium solution is then hydrolyzed in the known manner until about 95% of the titanium is precipitated with all of the zinc oxide and magnesium oxide. The resulting precipitate is washed and then calcined first at a temperature of about 800° C. for 1½ hours. The temperature is then raised to 900° C. for an additional half hour.

The resulting pigment, after cooling and pulverizing, comprises mixed crystals of zinc magnesium titanate corresponding to the ortho- and meta-varieties, possessing the crystalline structure of spinel and containing one atom of magnesium for every three atoms of zinc. It is especially uniform in particle size.

Example No. 7

In the practice of Example No. 3, one-half of one percent of a mineralizer in the form of $K_2SO_4$ is employed. The reaction time is cut down by about one-fourth.

Example No. 8

2100 grams of $ZnCl_2$ and 1500 grams of $MgCl_2$ are dissolved in 10 liters of water. 1200 grams of $TiO_2$ are suspended in the resulting solution. The mixture is warmed and a warm dilute sodium carbonate solution is added until all the zinc and magnesium have been precipitated as carbonate or hydrocarbonate. (The molecular equivalents of the resulting precipitates are about 1 mol. of ZnO plus MgO to 1 mol. $TiO_2$.)

The mixed precipitate is then calcined for about 2½ hours at about 875° C.

The resulting pigment after cooling and pulverizing comprises zinc-magnesium titanate corresponding to the ortho-variety, possessing the crystalline structure of spinel, and containing one atom of magnesium for every atom of zinc.

Example No. 9

A zinc titanate pigment prepared according to the disclosure of Serial No. 11,164 from 1.5 mol. of ZnO and 1.0 mol. of $TiO_2$, by heating the mixture for about 5 hours to 800° C. is heated for one hour and a half at about 850° C. with 0.5 mol. MgO. The magnesium oxide is taken up to form a zinc-magnesium titanate composition having the crystalline structure of spinel.

White pigments comprising zinc-magnesium titanate compositions prepared according to the present invention are characterized, in addition to their crystalline structure and chemical composition by being substantially free from uncombined titanium dioxide. They are substantially non-chalking, exceptionally resistant to weathering influences and possess high brightness and a pure white color. When pulverized after calcination in the manner well known to the art, they possess a smooth texture and a finely-divided and uniform particle size.

They are extremely useful in the preparation of surface coating compositions, whether paints, enamels, lacquers and the like, as well as the manufacture of paper, rubber, and, in general, wherever there exists a demand for a product possessing good pigment properties and for the delustration of artificial silk.

We have found that the tinting strength of our novel zinc-magnesium titanate pigments may be increased and a softer texture obtained if the starting mixtures before calcination, or the calcined products be subject to a pressure treatment in the presence of water or steam. Such a treatment may be employed at temperatures from about 110° C. up to 500° C. for about 1 to about 4 hours.

The novel zinc magnesium titanates of the present invention may be incorporated with extender materials, for example, barium sulfate, calcium sulfate and the like. The incorporation may be accomplished by mechanically mixing the zinc-magnesium titanate pigment with the extender, controlling, in the well-known manner, the manner of mixing and the particle size of the ingredients. Alternatively, the extender, provided it does not react with the starting materials or interfere with the calcination, may be incorporated with the starting mixture or mutually coprecipitated therewith.

The foregoing description of our invention has been given for clearness of understanding and no undue limitations should be deduced therefrom but the appended claims should be construed as broadly as possible in the light of the prior art.

We claim:

1. A composition adapted for use as a white pigment comprising crystalline zinc-magnesium titanate.

2. A composition adapted for use as a white pigment comprising zinc-magnesium titanate corresponding to the metatitanate, and possessing the crystalline structure of spinel.

3. A composition adapted for use as a white pigment comprising zinc-magnesium titanate corresponding to the metatitanate, and possessing the crystalline structure of corundum.

4. A composition adapted for use as a white pigment comprising zinc-magnesium titanate corresponding to the orthotitanate, and possessing the crystalline structure of spinel.

5. A composition adapted for use as a white pigment comprising zinc-magnesium titanate corresponding to the metatitanate, and zinc-magnesium titanate, corresponding to the orthotitanate, crystallizing together as mixed crystals of the spinel type.

6. A composition adapted for use as a white pigment comprising zinc-magnesium titanate possessing the crystalline structure of corundum and zinc-magnesium titanate possessing the crystalline structure of spinel.

7. A composition adapted for use as a white pigment comprising crystalline zinc-magnesium titanate intimately associated with an extender pigment.

8. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate.

9. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate and until the primary particles have attained such a size that sharp interference lines are observable on an X-ray photograph.

10. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. but not substantially more than 2.0 mols. of ZnO plus MgO and for such period of time that the titanium dioxide is practically completely combined with the zinc and magnesium as a zinc-magnesium titanate.

11. Process according to claim 8, in which the formation of the zinc-magnesium titanate is effected at temperatures between 500 and 800° C. and the resulting titanate is thereafter heated at a higher temperature within the range of 800° C. to 1100° C. until the product exhibits sharp interference lines on an X-ray photograph.

12. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate in the presence of a mineralizer.

13. Process for the preparation of a pigmentary zinc-magnesium titanate composition which comprises calcining at a temperature between about 500° C. and about 1100° C. a mixture of a reactive zinc compound, a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate and then washing the resulting product with an ammoniacal salt to remove uncombined ZnO and MgO.

14. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate, then washing the resulting product with an ammoniacal solution of an ammonium salt to remove uncombined ZnO and MgO and once more calcining the purified product.

15. Process for the preparation of a pigmentary zinc-magnesium titanate composition which comprises calcining at a temperature between about 500° C. and about 1100° C. a mixture of a reactive zinc compound, a reactive magnesium compound and a reactive titanium compound in such proportions that for every 1 mol. $TiO_2$ there will be present at least 0.9 mol. of ZnO plus MgO and for such period of time that the titanium dioxide is practically completely combined with the zinc and magnesium as a zinc-magnesium titanate after which the resulting product is subjected to a pressure treatment at temperatures between about 110 and about 500° C. in the presence of $H_2O$.

16. Process according to claim 8 in which the starting mixture of reactive zinc compound, reactive magnesium compound and reactive titanium compound is subjected to a pressure treatment at temperatures between about 110 and 500° C. in the presence of $H_2O$ prior to calcination.

17. Process according to claim 8 in which the starting mixture of reactive zinc compound, reactive magnesium compound and reactive titanium compound is obtained by precipitating one of the components as an insoluble compound from an aqueous solution of the soluble salt of the said component in the presence of finely-divided insoluble compounds of the other two components.

18. Process according to claim 8 in which the starting mixture of reactive zinc compound, reactive magnesium compound and reactive titanium compound is obtained by precipitating two of the components as insoluble compounds from an aqueous solution of soluble salts of the said components in the presence of a finely divided insoluble compound of the other component.

19. Process according to claim 8 in which the starting mixture of reactive zinc compound, reactive magnesium compound and reactive titanium compound is obtained by mutually precipitating all three components as insoluble compounds from an aqueous solution of soluble salts of the said components.

EKBERT LEDERLE.
MAX GÜNTHER.
RUDOLF BRILL.